US011554678B2

United States Patent
Badger, II et al.

(10) Patent No.: US 11,554,678 B2
(45) Date of Patent: Jan. 17, 2023

(54) VEHICLE DIRECT CURRENT FAST CHARGING

(71) Applicant: Ford Global Technologies, LLC, Dearborn, MI (US)

(72) Inventors: Charles Everett Badger, II, Westland, MI (US); Bryan Michael Bolger, Canton, MI (US); Angel Fernando Porras, Dearborn, MI (US); Zachary March, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 17/119,695

(22) Filed: Dec. 11, 2020

(65) Prior Publication Data

US 2022/0185126 A1   Jun. 16, 2022

(51) Int. Cl.
| B60L 53/10 | (2019.01) |
| B60L 53/63 | (2019.01) |
| B60L 53/66 | (2019.01) |

(52) U.S. Cl.
CPC ............. B60L 53/11 (2019.02); B60L 53/63 (2019.02); B60L 53/665 (2019.02); *B60L 2250/16* (2013.01)

(58) Field of Classification Search
CPC ...................................................... B60L 53/11
USPC ......................................................... 320/109
See application file for complete search history.

(56) References Cited

U.S. PATENT DOCUMENTS

| 4,558,281 | A | * | 12/1985 | Codd | B60L 58/21 |
| | | | | | 324/427 |
| 9,197,091 | B2 | | 11/2015 | Kishiyama et al. | |
| 9,299,093 | B2 | * | 3/2016 | Kidston | B60L 53/305 |
| 2010/0292855 | A1 | * | 11/2010 | Kintner-Meyer | B60L 53/305 |
| | | | | | 700/36 |
| 2011/0246252 | A1 | * | 10/2011 | Uesugi | G06Q 50/06 |
| | | | | | 705/7.12 |
| 2015/0360578 | A1 | * | 12/2015 | Duan | B60L 58/12 |
| | | | | | 340/455 |
| 2017/0010332 | A1 | * | 1/2017 | Kagami | G01R 31/392 |
| 2017/0158079 | A1 | | 6/2017 | Lim et al. | |
| 2018/0043786 | A1 | * | 2/2018 | Corbeil | H02J 7/0021 |
| 2018/0143258 | A1 | * | 5/2018 | Kim | G01R 31/396 |
| 2018/0334040 | A1 | | 11/2018 | Samojeden et al. | |
| 2019/0039467 | A1 | * | 2/2019 | Hortop | B60L 58/12 |
| 2019/0207180 | A1 | * | 7/2019 | Richter | B60L 50/64 |
| 2020/0164853 | A1 | * | 5/2020 | Son | B60W 20/00 |
| 2022/0080844 | A1 | * | 3/2022 | McGrath | B60L 5/42 |

FOREIGN PATENT DOCUMENTS

JP            2012060813 A       3/2012

* cited by examiner

*Primary Examiner* — Jerry D Robbins
(74) *Attorney, Agent, or Firm* — David B. Kelley; Brooks Kushman P.C.

(57) ABSTRACT

Responsive to a target charge level, a target charge completion time, and a maximum charge rate being sufficient to achieve the target charge level during an available charge duration defined by the target charge completion time, a controller charges the traction battery at a selected rate less than the maximum rate such that the traction battery continuously receives charge until occurrence of the target charge completion time and the traction battery achieves the target charge level at but not before the target charge completion time.

10 Claims, 4 Drawing Sheets

VEHICLE DIRECT CURRENT FAST CHARGING

TECHNICAL FIELD

The present disclosure relates to strategies for fast charging a vehicle battery.

BACKGROUND

Idling fees may be incurred by a vehicle that completes its charge at a DC fast charger and remains connected thereto.

SUMMARY

A hybrid vehicle includes a traction battery and controller. The controller, responsive to a maximum charge rate being sufficient to achieve a target charge level during an available charge duration defined by a target charge completion time, charges the traction battery at a selected rate less than the maximum rate such that the traction battery continuously receives charge until occurrence of the target charge completion time and the traction battery achieves the target charge level at but not before the target charge completion time. The controller further, responsive to the maximum charge rate being insufficient to achieve the target charge level during the available charge duration, charges the traction battery at the maximum charge rate such that the target charge level is not achieved at the target charge completion time.

A charger includes a charge interface and a controller. The controller, responsive to a defined target charge level, a defined target charge completion time, and a maximum charge rate being sufficient to achieve the target charge level during an available charge duration defined by the target charge completion time, charges a traction battery via the charge interface at a selected rate less than the maximum rate such that the traction battery continuously receives charge until occurrence of the target charge completion time and the traction battery achieves the target charge level at but not before the target charge completion time. The controller further, responsive to a user defined target charge level, a user defined target charge completion time, and the maximum charge rate being insufficient to achieve the target charge level during the available charge duration, charges the traction battery at the maximum charge rate such that the target charge level is not achieved at the target charge completion time.

A vehicle charging system includes a charging interface and a controller. The charging interface is co-operable with a charger. The interface is in electrical communication with a power network of a hybrid vehicle and a charger. The charger selectively electrically charges a vehicle battery with at least one of a plurality of electrical parameter settings, a power network, a plurality of electrical bus networks, and a sensor. The power network includes a vehicle battery. The sensor determines an electrical parameter of at least one of the plurality of electrical bus networks. The controller is within at least one of the charger and the hybrid vehicle. The controller is in electrical communication with at least one of the vehicle battery and the charger. The controller directs the charger to charge the battery with a first electrical parameter setting in response to an estimated rest time value being less than an estimated standard charging time value. The controller directs the charger to charge the battery with a second electrical parameter setting in response to an estimated rest time value being greater than an estimated standard charging time value.

DETAILED DESCRIPTION

Figure 1:
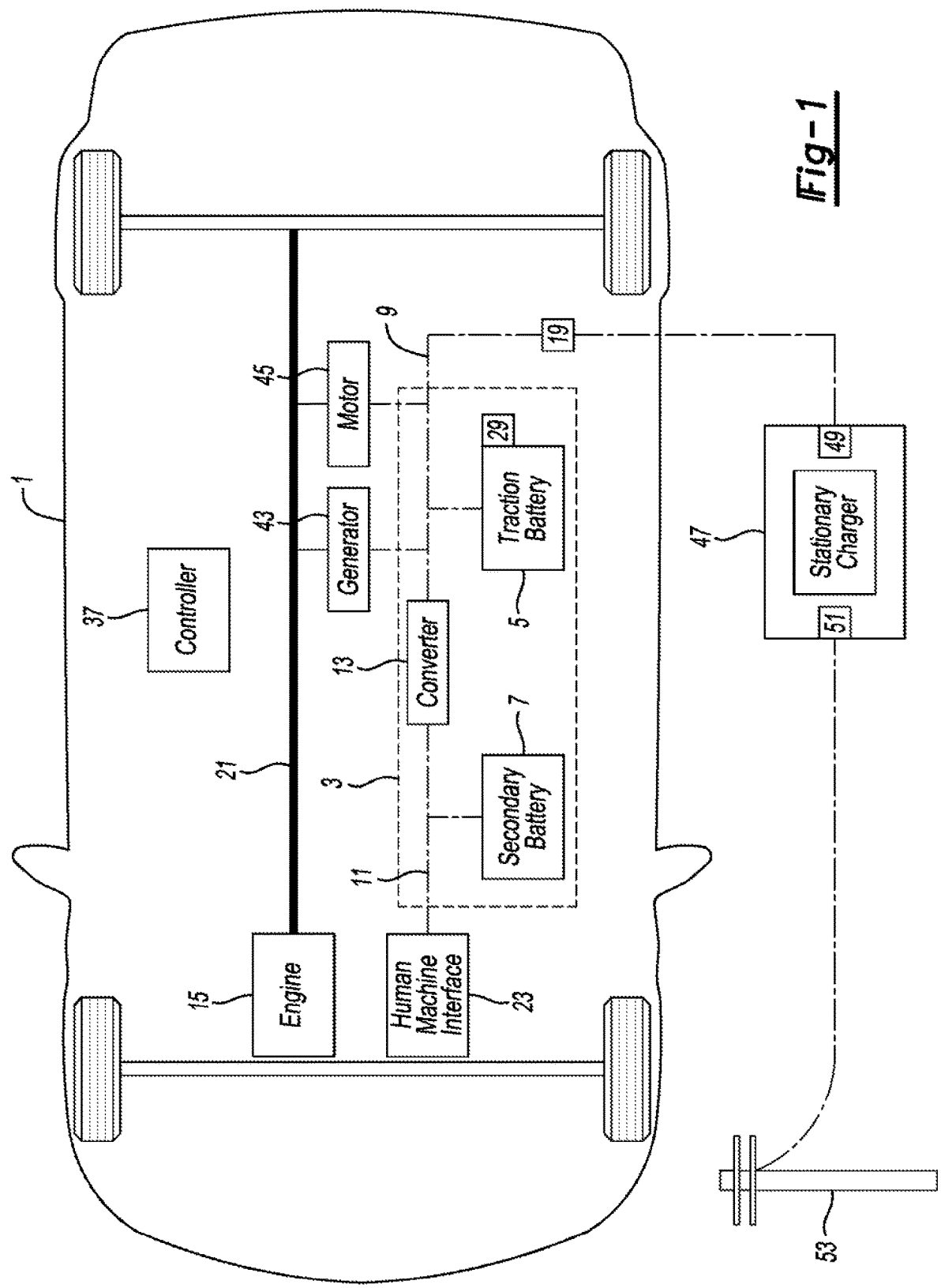
FIG. 1 is a schematic diagram of a vehicle.

As required, detailed embodiments are disclosed herein. It is to be understood, however, that the disclosed embodiments are merely exemplary-various and alternative forms are also contemplated. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

A human machine interface may allow a user to set a DC fast charge timer with or without a specific state of charge target. The amount of energy required to charge to the requested level by the desired time may then be calculated. This would allow for DC fast charging at lower rates while also giving the user more control.

One embodiment may comprise a vehicle and a stationary charger. One of the vehicle and stationary charger may comprise a controller. The controller may be in communication with and configured to selectively control one of an electric power source, a power network, a human-machine interface, a stationary charging interface, and other power related electrical components.

The vehicle may use an electric power source for propulsion. For example, the vehicle may include a traction battery used for propulsion of the vehicle. Additionally, the vehicle may be partially propelled by an internal combustion power source such as an internal combustion engine. In embodiments containing both electrical and internal combustion power sources, the internal combustion power source may be in electrical communication with the electrical power source, such that power generated by the internal combustion power source may be used to charge the electrical power source. In such embodiments, the internal combustion power source may use electrical power components to facilitate conversion of combustion power to electrical power. For example, the internal combustion power source may be in mechanical communication with a generator. The generator may be in electrical communication with the electrical power source. In this configuration, the internal combustion power source may use combustion to operate the generator, thus charging the electrical power source. The vehicle may comprise other electrical power components.

The vehicle may have a plurality of energy storage power sources. For example, the vehicle may include a traction battery configured to provide one of electrical current, voltage, and power for vehicle propulsion in which the one of the current, voltage, and power value is a first predetermined value. In addition to the traction battery, the vehicle may include a supplementary battery configured to provide one of electrical current, voltage, and power, wherein the one of the current, voltage, and power value is a second predetermined value distinct from the first predetermined value. Energy from the supplementary battery may be used for vehicle needs outside of propulsion. Alternatively, the supplementary battery may be used as a backup, or in addition to the traction battery for propulsion.

The vehicle may have a vehicle power network. The vehicle power network may include a plurality of electrical bus networks. For example, the power network may include a high-voltage bus network and a low-voltage bus network. In such embodiments, the vehicle power network may include a high-volt battery in direct electrical communication with the high-voltage bus network. Similarly, the power network may include a low-volt battery in direct electrical communication with the low-voltage bus network. The power network may further comprise a converter between the high-voltage and low-voltage bus networks. The converter may allow and regulate electrical communication between the high-voltage and low-voltage bus networks. The converter may be a DC/DC converter. As such, the converter may decrease the electrical potential parameter of electricity traversing from the high-voltage bus network to the low-voltage bus network. Further, the converter may increase the electrical potential parameter of electricity traversing from the low-voltage bus network to the high-voltage bus network. The converter may be configured to selectively allow and inhibit electrical communication between the plurality of electrical networks. In alternate embodiments, the power network may comprise alternate converters that may change other electrical parameters of electricity traversing between the bus networks. Still in other embodiments, the power network may comprise a plurality of converters for the regulation of electrical communication between the electrical bus networks. Even further, the converter may allow a plurality of electrical communication values. For example, the converter may be configured to allow a plurality of electrical current values. In some embodiments, the plurality may be comprised of discrete values. In alternate embodiments, the plurality may be comprised of a range of analog values. The power network may include a charging interface. The charging interface may be configured to receive electrical power from a stationary charger and provide electrical power to one of the plurality of electrical bus networks. The charging interface may be configured to selectively permit electricity to traverse from the stationary charger to the one of the plurality of electrical bus networks based on the electrical parameter of the electricity. The charging interface may be further configured to change the electrical parameters of the electricity traversing from the stationary charger to the one of the plurality of electrical bus networks.

The vehicle may be in electrical communication with a stationary charger. In particular, the power network of the vehicle may be in electrical communication with the stationary charger. The stationary charger may be configured to provide electricity of varying electrical parameters. For example, the stationary charger may be configured to provide electricity of a first set of electrical parameters, wherein the electricity has a potential of 240 volts and an electrical current of 10 amps, providing an electrical power of 2400 watts, and further configured to provide electricity of a second set of electrical parameters, wherein the electricity has a potential of 240 volts and an electrical current of 5 amps, providing an electrical power of 1200 watts. The stationary charger may have a plurality of discreet sets of electrical parameters. Alternatively, the stationary charger may increase and decrease an electrical parameter in an analog pattern. The stationary charger may be in electrical communication with a power grid. The stationary charger may be configured to convert electricity having alternating current provided by the power grid into electricity having direct current for reception of the vehicle.

One of the power network and the stationary charger may include a sensor. At least one of the power network, the stationary charger, or the combination of both may include a plurality of sensors. One of the sensors may be in electrical communication with one of the plurality of electrical bus networks. The sensor may be configured to determine an electrical parameter of one of the plurality of electrical bus networks. For example, a sensor may be configured to determine the electrical current traversing throughout one of the electrical bus networks. Alternatively or additionally, a sensory may be configured to determine at least one of the electrical potential, and electrical power traversing throughout one of the electrical bus networks. The power network may include a thermal sensor. The thermal sensor may be in thermal communication with an electrical power source. For example, the thermal sensor may be in thermal communication with a vehicle traction battery, the thermal sensor configured to determine the temperature of the traction battery. The stationary charger may include a thermal sensor configured to determine the temperature of electrical power components. The stationary charger may include an electrical parameter sensor. The electrical parameter sensor may be configured to determine the electrical parameters of electrical power components used to charge the electrical power source. For example, the stationary charger may include a voltage sensor configured to determine the electrical potential used to charge a traction battery. As the stationary charger may be in electrical communication with both an AC power grid and a DC power grid, the stationary charger may have a sensor on at least one of the AC power grid and the DC power grid. In some embodiments, the stationary charger may have an electrical parameter sensor within or in electrical communication with the AC power grid. For example, the stationary power grid may include an electrical phase sensor in electrical communication with the AC power grid. The electrical phase sensor may be configured to determine the phase of at least one of the electrical potential and the electrical current of the electricity throughout the AC power grid. The stationary charger may employ a plurality of electrical phase sensors in communication with the AC power grid to determine the phase of at least one of the electrical potential and the electrical current of the electricity. The controller may be configured to determine an electrical phase differential in part by reading the electrical parameter sensor in communication with the AC power grid. The electrical phase differential may be based in part on the difference between an electrical potential phase and an electrical current phase. Additionally or alternatively, the stationary charger may include electrical parameter sensors configured to determine one of an electrical potential, electrical current, electrical power, electrical frequency, and other electrical parameters of either the AC power grid or the DC power grid.

One of the vehicle and the stationary charger may include a human-machine interface (HMI). The HMI may be configured to receive an input. The input may be an expected rest time value. The expected parked time value may be indicative of an estimate a user expects to allow the vehicle to charge. The HMI may be further configured to provide the input to the controller. For example, the HMI may receive an expected parked time of an hour and provide this expected time to the controller. The input may be a target charge level. For example, the input may be 800% full. The target charge level may default to 100%. The target charge level may further be dictated by other algorithms in the controller, such as algorithms to prolong the life of the battery. The HMI may be disposed within the vehicle. For example, the HMI may be within an infotainment system of the vehicle. The HMI may be accessed by a screen of the infotainment system for a user to input the expected parked time value. Additionally or alternatively, the HMI may be disposed within or on the stationary charger. For example, the HMI may be defined by an input screen or pad on a surface of the stationary charter. Even further, additionally or alternatively, the HMI may be disposed within a computing device. The computing device may be remote from both the vehicle and the stationary charger. For example, the HMI may be defined by an application of a smart phone.

The controller may be configured to calculate a predicted parked time value. The predicted parked time value may be based on historical data of the vehicle. In some embodiments, the predicted parked time value may be dependent upon the geographical location of the vehicle. For example, the predicted parked time for a vehicle parked at a user's place of work determined by geographical location may be 8 hours. The predicted parked time value may be dependent upon a global time value. For example, if a driver parks the car late at night, such as 10 μm, the controller may determine the vehicle will be parked until morning, such as 8 am.

The controller may be configured to generate, log, and update historical data. The predicted parked time value may be based on dynamic and/or historical data about the vehicle. In some embodiments, the predicted parked time value may be dependent upon weather. For example, the predicted parked time for a vehicle subject to a future violent storm may be determined to be less than the time until the occurrence of the violent storm. In some embodiments, the predicated parked time value may be dependent upon road traffic. For example, if the controller is informed that traffic is expected, the controller may determine that the predicted parked time value is less than the amount of time until traffic reaches a threshold. The predicted parked time value may be based on the amount of parking fair paid by a user. For example, if the controller is provided a parking time limit, duration of free parking, or amount of time purchased for parking, the predicted parked time value may be less than the expiration of proper parking. In some embodiments, the controller may be provided the proper parking duration based in part on communicating with an application on a remote computing device suited for parking transactions. The predicted parked time value may be based on the activity the user is engaged in. For example, the predicted parked time value may be an hour if the vehicle is parked at a restaurant. Alternatively, the predicted parked value may be 4 hours if the vehicle is parked at a water park. The controller may contain an activity schedule having entries of expected time for specific activities. Further the entries of the activity schedule may be updated based on historical values of the vehicle.

The controller may be configured to calculate the target charge completion time value. The target charge completion time value may be based on one of the target charge completion time value and/or a predicted parked time value. Further, the target charge completion time value may be based on the combination of the target charge completion time value and the predicted parked time value.

The controller may be configured to monitor the price of electricity. For example, the controller may be in communication with a computing device such that the controller is provided prices of electricity based on at least time.

The controller may be in electrical communication with the electrical power source such that the controller is provided a present state of charge of the electrical power source. The controller may be in communication with a thermal sensor and as such, the controller may be provided a temperature reading of the electrical power source. The controller may be configured to monitor one of a SOC differential and a temperature differential. The controller may include an SOC schedule having entries indicative of expected SOC differential. The controller may be configured to request charging with a third set of electrical parameters in response to the present SOC differential value being out of a range of the expected SOC value. The controller may be configured to request charging with a third set of electrical parameters in response to the temperature of the electrical power source being greater than a temperature threshold.

The controller may include a specification log. The specification log may include entries indicative of the maximum and minimum electrical parameters suited for at least one of the power network, electrical power source, stationary charger, and other power electronic devices. The controller may be configured to request electrical power subject to the maximum and minimum electrical parameters. For example, the controller may be configured to request electrical power with a maximum of 10 amps as an electrical current factor from a stationary charger capable of providing 20 amps. The specification log may include a plurality of models of electronic components. The maximum electrical parameters allowable for a model while charging may be the maximum charge rate. The controller may be configured to automatically detect the models of electronic components in communication with the controller.

The controller may include a power algorithm. The power algorithm may refer to the maximum charge rate value, the target charge level value, and the target charge completion time value. The power algorithm may be configured such that responsive to the determination that the maximum charge rate is sufficient to achieve the target charge level during the available charge duration, the controller may request that the stationary charger charge at a selected rate less than the maximum rate such that the electrical power source continuously receives charge until occurrence of the target charge completion time and the electrical power source achieves the target charge level at but not before the target charge completion time. Additionally or alternatively, the power algorithm may be configured such that responsive to the maximum charge rate being insufficient to achieve the target charge level during the available charge duration, the controller may request that the stationary charger charge at the maximum charge rate such that the target charge level is not achieved at the target charge completion time. The power algorithm may vary the rate of charge throughout available charge duration. For example, the power algorithm may request charge of both a first and second set of electrical parameters for charging an electrical power source capable of being charged to full in the available charge duration. Alternatively, the controller may request electrical parameter charge change in an analog fashion.

FIG. 1 depicts an embodiment comprising a vehicle 1. The vehicle 1 includes a power network 3. The power network 3 includes a high-voltage bus network 9, and a low-voltage bus network 11. The high-voltage bus network 9 includes a traction battery 5. The low-voltage bus network 11 includes a secondary battery 7. The power network 3 further includes a converter 13 disposed between the high-voltage bus network 9 and the low-voltage bus network 11. The power network 3 is in electrical communication with a generator 43. The generator 43 is in mechanical communication with an internal combustion engine 15. As such, the internal combustion engine 15 may provide power to the power network 3 via the generator 43. The vehicle 1 has a stationary charging interface 19 in electrical communication with the power network 3, the interface 19 configured to allow stationary charging to one of the traction battery 5, and the secondary battery 7 via the power network 3. The vehicle 1 has a drivetrain 21 in communication with the power network 3 such that one of the traction battery 5 and the secondary battery 7 may fulfil torque demands of the vehicle. The vehicle 1 has a human machine interface 23 such that a user may input a target level charge value and an available duration. The power network 3 may have a temperature sensor 29 in thermal communication with the traction battery 5. The vehicle 1 has a controller 37. The controller 37 is in electrical communication with the traction battery 5, the secondary battery 7, the converter 13, the internal combustion engine 15, the stationary charging interface 19, the drive train 21, the human machine interface 23, and the stationary charger 47. The stationary charger 47 has a DC interface 49 and an AC interface 51. The stationary charger 47 is in electrical communication with the power grid 53. One of the controller 37 and the stationary charger 47 may be configured to receive data regarding the present and future price of electrical power. The controller 37 may implement one of a first power algorithm 200, a second power algorithm 300, and a third power algorithm 400.

Figure 2:
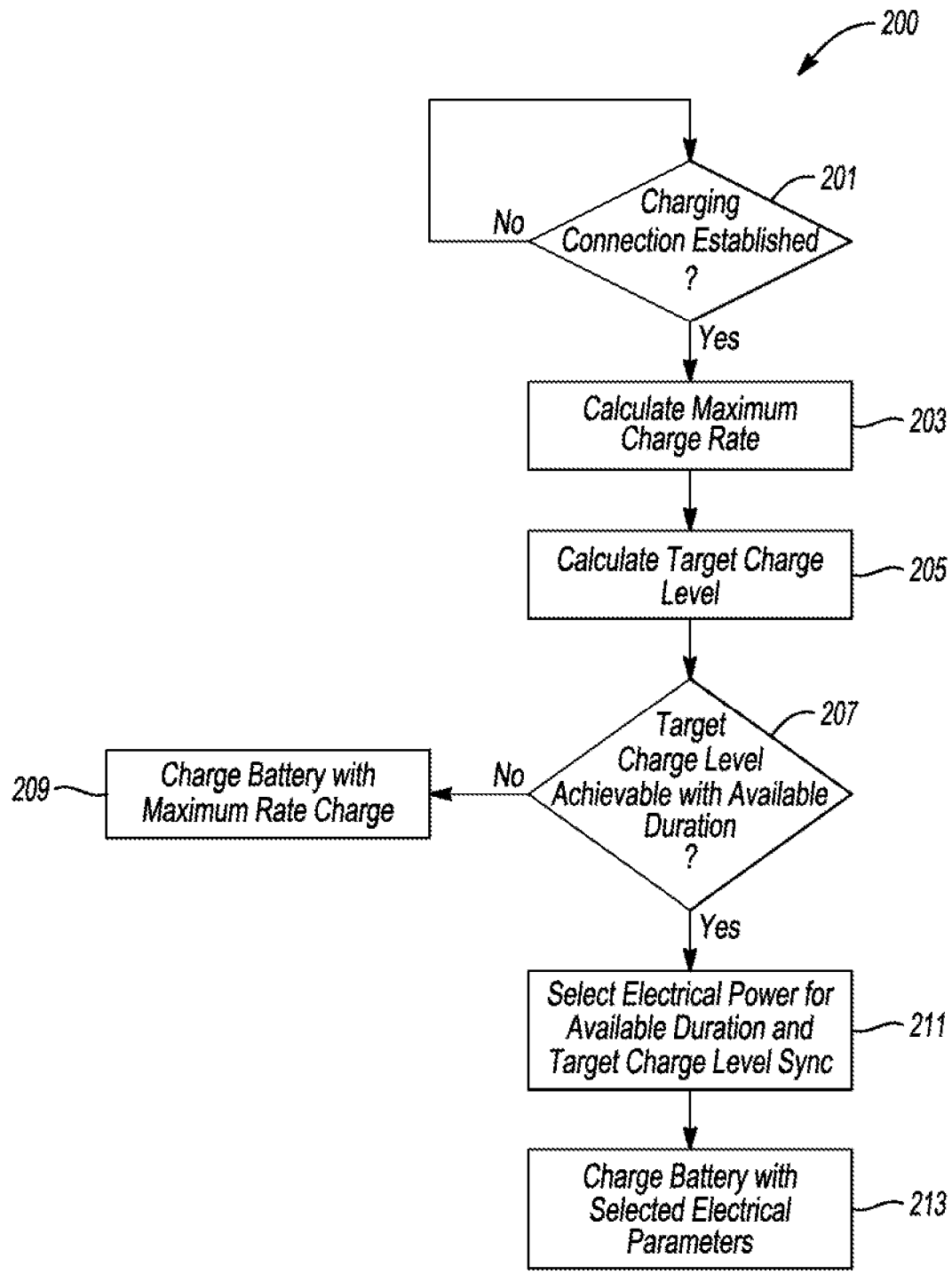
FIGS. 2-4 are flow charts of charging algorithms.

FIG. 2 depicts a power algorithm 200. The power algorithm 200 starts by monitoring a charging connection in charging connection step 201. Upon establishing a connection, the controller 37 calculates the maximum charge rate in max rate step 203. Next, the controller gathers the target charge level in target charge step 205. The controller 37 will then determine if the maximum charge rate would be sufficient to charge the battery 5 to the target charge level in comparison step 207. If not, the controller 37 will request that the vehicle receives the maximum charge rate in max rate step 209. If the maximum charge rate is sufficient, the controller 37 will select electrical parameters to provide power less than the maximum that will allow the battery 5 to reach a charge level at the same time the available duration expires in parameter selection step 211. Lastly, the controller 37 will request that the vehicle receives the charge with the selected parameters in the selected power step 213.

Figure 3:
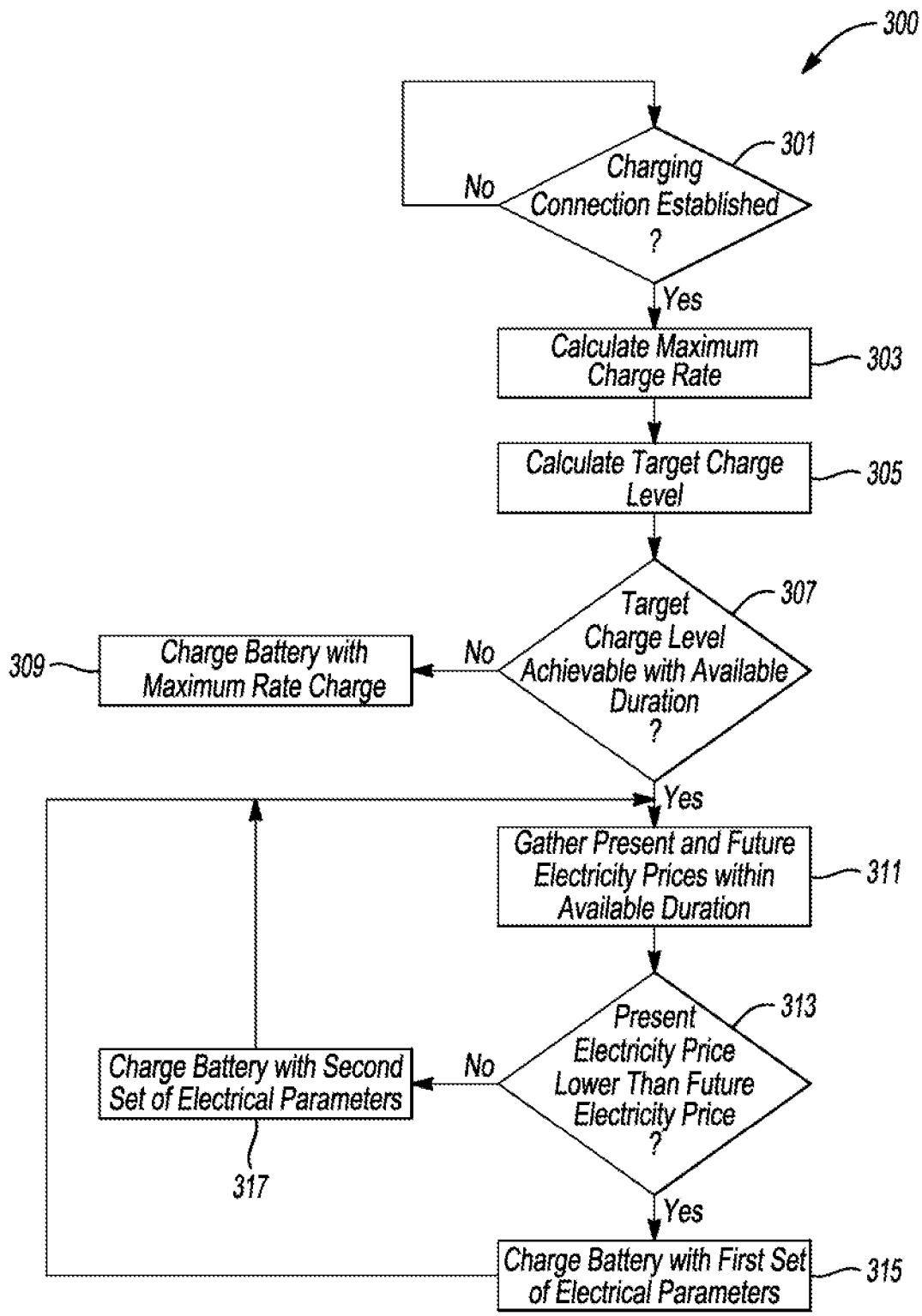

FIG. 3 depicts a power algorithm 300. The power algorithm 300 starts by monitoring a charging connection in charging connection step 301. Upon establishing a connection, the controller 37 calculates the maximum charge rate in max rate step 303. Next, the controller gathers the target charge level in target charge step 305. The controller 37 will then determine if the maximum charge rate would be sufficient to charge the battery 5 to the target charge level in comparison step 307. If not, the controller 37 will request that the vehicle receives the maximum charge rate. If the maximum charge rate is sufficient, the controller 37 gathers present and future electricity prices that are within the available duration in price gather step 311. Next, the controller will compare the present price with a future price in comparison step 313. If the present price is less than the future price, the controller 37 will request that the vehicle receives charge with a first set of electrical parameters in the first set step 315. If the present price is greater that the future price, the controller 37 will request that the vehicle receives charge with a second set of electrical parameters in the second set step 317. Both the first set step 315 and the second set step 317 return to the gather step 311.

Figure 4:
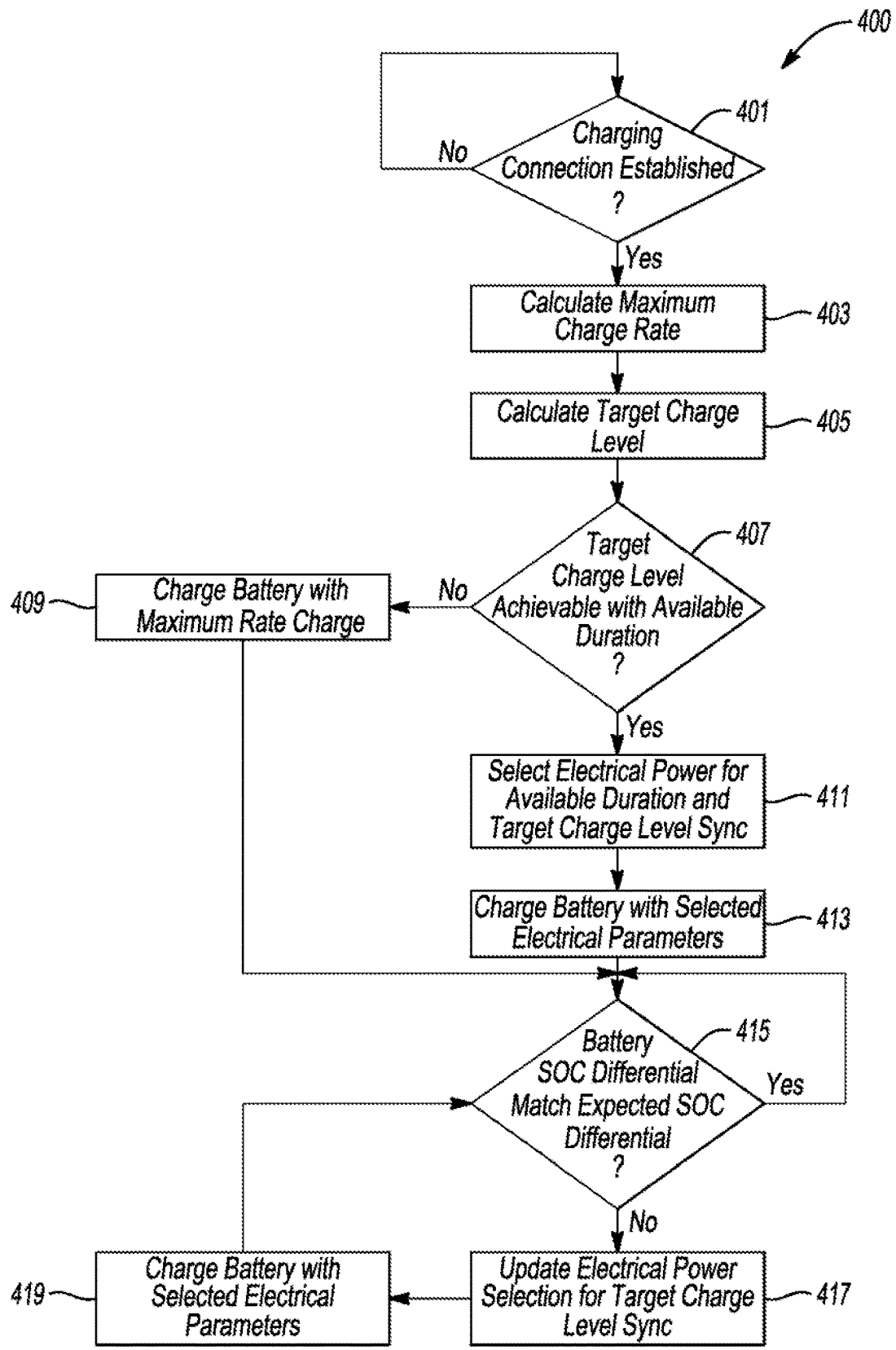

FIG. 4 depicts a power algorithm 400. The power algorithm 400 starts by monitoring a charging connection in charging connection step 401. Upon establishing a connection, the controller 37 calculates the maximum charge rate in max rate step 403. Next, the controller gathers the target charge level in target charge step 405. The controller 37 will then determine if the maximum charge rate would be sufficient to charge the battery 5 to the target charge level in comparison step 407. If not, the controller 37 will request that the vehicle receives the maximum charge rate in max rate step 409. If the maximum charge rate is sufficient, the controller 37 will select electrical parameters to provide power less than the maximum that will allow the battery 5 to reach a charge level at the same time the available duration expires in parameter selection step 411. Next, the controller 37 will request that the vehicle receives the charge with the selected parameters in the selected power step 413. The controller 37 will then compare the present battery SOC differential with the expected SOC differential in the compare step 415. Additionally, the max rate step 409 leads to the compare step 415. If the differentials match within a range, the controller 37 will continue to monitor the differentials. However, if the differentials do not match within a range, the controller will update the selected power request to match battery charging performance in update step 417. The controller 37 will then request the vehicle battery is charged with the updated selected electrical parameters in charge request step 419, followed by returning to monitor the battery SOC differential in compare step 415.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:

a traction battery; and a controller programmed to, responsive to a maximum charge rate being sufficient to achieve a target charge level during an available charge duration defined by a target charge completion time, charge the traction battery at a selected rate less than the maximum rate such that the traction battery continuously receives charge until occurrence of the target charge completion time and the traction battery achieves the target charge level at but not before the target charge completion time, and responsive to the maximum charge rate being insufficient to achieve the target charge level during the available charge duration, charge the traction battery at the maximum charge rate such that the target charge level is not achieved at the target charge completion time.

2. The vehicle of claim 1, wherein the selected rate is based on a cost of charge energy.

3. The vehicle of claim 1, wherein the selected rate is based on a power grid electrical parameter value.

4. The vehicle of claim 1, wherein the selected rate is constant.

5. The vehicle of claim 1, wherein the selected rate varies.

6. A method for operating a charge station, comprising:

responsive to input via a charge interface indicating a defined target charge level and a defined target charge completion time, and responsive to a maximum charge rate being sufficient to achieve the target charge level during an available charge duration defined by the target charge completion time, charging a vehicle traction battery via the charge interface at a selected rate less than the maximum rate such that the vehicle traction battery continuously receives charge until occurrence of the target charge completion time and the vehicle traction battery achieves the target charge level at but not before the target charge completion time, and responsive to the maximum charge rate being insufficient to achieve the target charge level during the available charge duration, charging the vehicle traction battery at the maximum charge rate such that the target charge level is not achieved at the target charge completion time.

7. The method of claim 6 further comprising selecting the selected rate based on a cost of charge energy.

8. The method of claim 6 further comprising selecting the selected rate based on a power grid electrical parameter.

9. The method of claim 6, wherein the selected rate is constant.

10. The method of claim 6, wherein the selected rate varies.

* * * * *